US011235562B2

(12) United States Patent
Grefenstein et al.

(10) Patent No.: US 11,235,562 B2
(45) Date of Patent: Feb. 1, 2022

(54) RECYCLABLE PE PACKAGING FILM WITH IMPROVED STIFFNESS

(71) Applicant: Constantia Pirk GmbH & Co. KG, Pirk (DE)

(72) Inventors: Achim Grefenstein, Altrip (DE); Pragnesh Shah, Ahmedabad (IN); Saket Jha, Ahmedabad (IN)

(73) Assignee: Constantia Pirk GmbH & Co. KG, Pirk (DE)

( * ) Notice: Subject to any disclaimer, the term of this patent is extended or adjusted under 35 U.S.C. 154(b) by 0 days.

(21) Appl. No.: 17/270,962

(22) PCT Filed: Oct. 11, 2019

(86) PCT No.: PCT/EP2019/077561
§ 371 (c)(1),
(2) Date: Feb. 24, 2021

(87) PCT Pub. No.: WO2020/074688
PCT Pub. Date: Apr. 16, 2020

(65) Prior Publication Data
US 2021/0252839 A1 Aug. 19, 2021

(30) Foreign Application Priority Data
Oct. 13, 2018 (IN) .............................. 201811038930

(51) Int. Cl.
| B32B 27/08 | (2006.01) |
| B29C 48/18 | (2019.01) |
| B32B 27/18 | (2006.01) |
| B32B 27/30 | (2006.01) |
| B32B 27/32 | (2006.01) |
| B32B 27/34 | (2006.01) |
| B32B 38/06 | (2006.01) |
| C08L 23/06 | (2006.01) |
| C08L 23/14 | (2006.01) |
| C08L 53/00 | (2006.01) |
| B32B 7/12 | (2006.01) |

(52) U.S. Cl.
CPC .............. *B32B 27/08* (2013.01); *B29C 48/18* (2019.02); *B32B 27/18* (2013.01); *B32B 27/306* (2013.01); *B32B 27/32* (2013.01); *B32B 27/34* (2013.01); *B32B 38/06* (2013.01); *C08L 23/06* (2013.01); *C08L 23/14* (2013.01); *C08L 53/00* (2013.01); *B32B 7/12* (2013.01); *B32B 2307/31* (2013.01); *B32B 2307/7244* (2013.01); *B32B 2307/7248* (2013.01); *B32B 2307/732* (2013.01); *B32B 2307/75* (2013.01); *B32B 2439/70* (2013.01); *C08L 2203/162* (2013.01); *C08L 2205/02* (2013.01); *C08L 2205/24* (2013.01); *C08L 2207/02* (2013.01); *C08L 2207/062* (2013.01)

(58) Field of Classification Search
CPC .......... B32B 27/08; B32B 7/12; B32B 27/18; B32B 27/32; B32B 27/306; B32B 27/34; B32B 38/06; C08L 23/14; C08L 53/00; C08L 2205/02; C08L 2205/24; C08L 2207/062; C08L 2207/02; C08L 2203/162; C08L 23/06; B29C 48/18
USPC ....................................... 428/476.9
See application file for complete search history.

(56) References Cited

U.S. PATENT DOCUMENTS

| 5,885,721 | A | 3/1999 | Su et al. |
| 6,413,333 | B1* | 7/2002 | Bader .................... B32B 27/18 |
| | | | 156/244.11 |
| 7,186,366 | B2 | 3/2007 | Schwinn |
| 2018/0079188 | A1 | 3/2018 | Grefenstein et al. |

FOREIGN PATENT DOCUMENTS

| DE | 19859789 C1 | 6/2000 |
| EP | 2409836 B1 | 5/2016 |
| WO | 9814491 A1 | 4/1998 |
| WO | 2016156293 A1 | 10/2016 |
| WO | 2018042299 A1 | 3/2018 |

OTHER PUBLICATIONS

Indian Search Report with Translation; Application No. 201811038930; dated Jan. 28, 2020; 6 Pages.
International Search Report and Written Opinion of the International Searching Authority; Application No. PCT/EP2019/077561; Completed: Jan. 8, 2020; dated Jan. 14, 2020; 10 Pages.

* cited by examiner

*Primary Examiner* — Hui H Chin
(74) *Attorney, Agent, or Firm* — Whitmyer IP Group LLC

(57) ABSTRACT

The present teaching concerns a recyclable co-extruded PE packaging film with a first laminate layer of at least 60 vol % HDPE and a second laminate layer of a hetero-phase polypropylene block copolymer with a polyethylene content of 5-30 wt. % and a melting point higher than 155° C., preferably higher than 160°, the thickness of the second laminate layer being less than 5 μm.

15 Claims, 2 Drawing Sheets

RECYCLABLE PE PACKAGING FILM WITH IMPROVED STIFFNESS

TECHNICAL FIELD

The present teaching concerns a recyclable polyethylene film with a first laminate layer of at least 60 vol %, preferably 80 vol %, HDPE and a second laminate layer of polypropylene, which is attached to the polyethylene film of the first laminate layer by co-extrusion, wherein the thickness of the polyethylene film being less than 40 µm. The present teaching additionally concerns a recyclable packaging laminate with such a polyethylene film, which is attached to a sealing layer.

BACKGROUND

The packaging industry uses packaging films or packaging laminates, which are to exhibit different properties depending upon the application. Such packaging films or packaging laminates are usually multilayer plastic films, which are produced by an extrusion process, a co-extrusion process (in both cases by both a cast film and a blown film process) or a lamination process (joining individual layers by means of a laminating adhesive as well as by extrusion lamination), as well as mixtures thereof.

For reasons of recyclability, there is also an effort to produce pure packaging films or packaging laminates based on a single kind of plastic, for example packaging laminates made only of polyethylene or of a mixture of polyethylene-based plastics with plastics that are compatible regarding recyclability in acceptable low amounts.

A packaging laminate usually also has a sealing layer, so as to make a package, e.g., a bag, out of the packaging laminate by way of heat-sealing. A sealing layer is typically made of a polyolefin, usually polypropylene (PP) or polyethylene (PE) of different densities, like LLDPE, LDPE, MDPE or HDPE, and also in the form of mixtures thereof, whereas different materials naturally also being usable for the sealing layer. For purposes of sealing, for example for purposes of producing a package such as a bag, the folded packaging laminate is compressed between two temperature-controlled sealing jaws. A packaging laminate is also compressed between temperature-controlled sealing jaws when containers are sealed with covering lids. The sealing medium then melts, whereby a bond between the neighboring sealing layers is formed after cooling. In doing so, it is naturally desirable to reduce the time for sealing as much as possible, since this can increase the throughput on a packaging machine. This can, e.g., be achieved with higher sealing temperatures, since the heat is conducted more rapidly from the outside to the inside at the sealing area. However the maximum possible sealing temperature naturally depends in particular on the material of the outermost layer of the packaging laminate facing the sealing jaw, particularly on the melting temperature of this material. HDPE has a melting point of about 130° C. for example. Assuming a minimum required sealing temperature of 80° C. (rather significantly above that), one realizes that the sealing range (the temperature range in which the sealing is to be accomplished) is narrow. This makes the processing more difficult on one hand and also reduces the achievable sealing times on the other hand.

One could overcome this by using materials having a higher heat resistance, e.g., a polyester (like PET), in the outermost layer. However, this is precluded by the fact that a packaging laminate made of PE materials with a PET layer cannot be recycled. Admixing polypropylene (PP) with the HDPE of the outer layer or a thin PP outer layer would increase the heat resistance, as for example mentioned in WO 2016/156293 A1, which also mentions that the recyclability is not adversely affected when at most 20 vol % of PP is used in the film. A mixture of HDPE with a cycloolefin copolymer (COC) would also increase the heat resistance and would still be acceptable from the viewpoint of recyclability if small amounts of COC were added. However COCs are expensive, which makes them rather uninteresting for use in packaging laminates, for which the costs play an important role.

It is known from the EP 2 409 836 B1 to use a polypropylene block copolymer having a high melting point greater than 160° C. in an outer layer of a polypropylene packaging laminate to prevent adhesion to the sealing jaws. In EP 2 409 836 B1 polypropylene is used as the material for the packaging laminate because a package, for example a bag, produced therewith is to be sterilized at 121° C., which excludes polyethylene as a material for a sterilizable packaging laminate because of its lower melting points.

Packaging films or packaging laminates usually undergo several processing steps in production, such as, for example, steps for joining different layers, printing, coating, etc., which can also take place at higher temperatures. In production, the packaging film or the packaging laminate passes through an entire manufacturing process, which also comprises repeated redirections over guide rollers, repeated winding on rollers, repeated changes of temperature, etc. In doing so, the packaging film or the packaging laminate is also subjected to different longitudinal strains, which can also sometimes be undesired. The register error can, for example, be increased by printing in a multicolor printing process due to undesired longitudinal elongation, which can impair the quality of the printed image. An elastic modulus (E-modulus), and along with it a high web stiffness, of the packaging film or the packaging laminate that is as high as possible, preferably in the processing direction, is thus desirable, since such elongations can then be reduced. A high E-modulus (a high web stiffness) was heretofore achieved by way of special materials in the packaging film or the packaging laminate and/or via additional manufacturing steps, such as, e.g., stretching.

In order to achieve a sufficient web stiffness of a PE film at 70° C., WO 2016/156293 A1 proposes placing a center layer of LLDPE or mLLDPE in between two HDPE outer layers and stretching the PE film in at least one direction. The stretching increases the stiffness sufficiently and simultaneously reduces the haze value, which is to be equated with improved transparency. However, stretching naturally requires an additional processing step, which increases the manufacturing cost.

SUMMARY

It is an object of the present teaching to disclose a recyclable PE packaging laminate, which can be produced in a simple manner and which has an improved E-modulus and an improved web stiffness.

This object is achieved in that the polypropylene of the second laminate layer is a hetero-phase polypropylene block copolymer with a polyethylene content of 5-30 wt. % and having a melting point higher than 155° C., preferably higher than 160°, while the thickness of the second laminate layer is less than 5 µm. It was surprisingly discovered that such a thin layer of a hetero-phase polypropylene block copolymer on the outer surface of a polyethylene film or the packaging laminate can not only significantly increase the heat resistance in sealing as expected, but that the E-modulus and the web stiffness of the polyethylene film are also increased. It is thus only necessary to use a polyethylene a film with an HDPE content of at least 60 vol %, while the polyethylene film neither has to be stretched nor has to have a certain layer structure. Because of its low thickness, the polypropylene block copolymer layer also does not affect the recyclability of the polyethylene film or the packaging laminate. This is because, on the one hand, it has a relatively high polyethylene content and, on the other hand, because, as was determined by own investigations, it is sufficiently thin for the polyethylene material under it to be detected by the sensors, for example by NIR (near infrared) sensors, in a recycling unit. Because of the high heat resistance of the outside polypropylene layer, the sealing temperature can be increased significantly despite the low thickness, which shortens the sealing times and makes the sealing process more flexible because the sealing temperature range is significantly increased thereby. The sealing process can thereby be made faster, safer and more flexible without the outer polypropylene layer sticking to the sealing jaw or resulting in unwanted visual markings on the packaging laminate.

The surprising effect of the outer polypropylene layer consisting of a hetero-phase polypropylene block copolymer is however evident from the fact that, despite the very low thickness of the polypropylene layer of less than 5 μm, the elastic modulus and the web stiffness of the polyethylene film mainly consisting of HDPE, and concomitantly of the packaging laminate, are increased for purposes of further processing, without the need to stretch the polyethylene film. A hetero-phase polypropylene block copolymer and HDPE have about the same elastic modulus according to the data sheets for the types of polymers used. Hence, a similar elastic modulus can be expected if these two materials are combined. It was however surprisingly discovered that by the simultaneous co-extrusion of both materials, preferably by the blown film extrusion process, the elastic modulus of the polyethylene film co-extruded with the polypropylene block copolymer is clearly higher than would be expected based on the elastic modulus of the starting materials.

There are also types of polypropylene block copolymers available, which have a sufficiently low haze value, in particular lower than 20, preferably lower than 10, so that the polyethylene film ends up having a sufficiently low haze value. This is of particular advantage for printability by reverse printing, since the polyethylene film is sufficiently transparent for the printed image to shine through.

The heat resistance can be increased further and the Haze value of the material decreased further by adding a nucleating agent to the polypropylene block copolymer of the second laminate layer and/or the first laminate layer.

BRIEF DESCRIPTION OF THE DRAWINGS

The present teaching is elucidated hereafter by referring to the FIGS. 1 to 5, which show schematic and nonrestrictive embodiments of the present teaching as follows.

DETAILED DESCRIPTION

The present teaching is hereinafter described in greater detail, while certain characteristics of a plastic film, which are measured and/or defined as follows, are referred to in the subsequent description. This falls back on measuring methods defined in well-known ASTM (American Society for Testing and Materials) standards.

Young's Modulus or E-Modulus:

This property is measured according to ASTM D882, with the 2% secant modulus defined in this standard being used here as the E-modulus (in MPa). A 100 mm long by 25 mm wide sample of the film web was used for this measurement of the E-modulus and the E-modulus was measured at a testing speed of 10 mm/min. The E-modulus of a co-extruded plastic film usually differs in the machine direction and crosswise.

Transparence (Haze):

The haze value is a measure of the transparence of transparent samples. The higher the haze value, the more cloudily (less transparent) is a plastic film. The method for measuring the haze value is described in the standard ASTM D1003.

Web Stiffness:

The web stiffness (in N/mm) is understood to be the product of the E-modulus defined above and the thickness of the measured film web.

Figure 1:
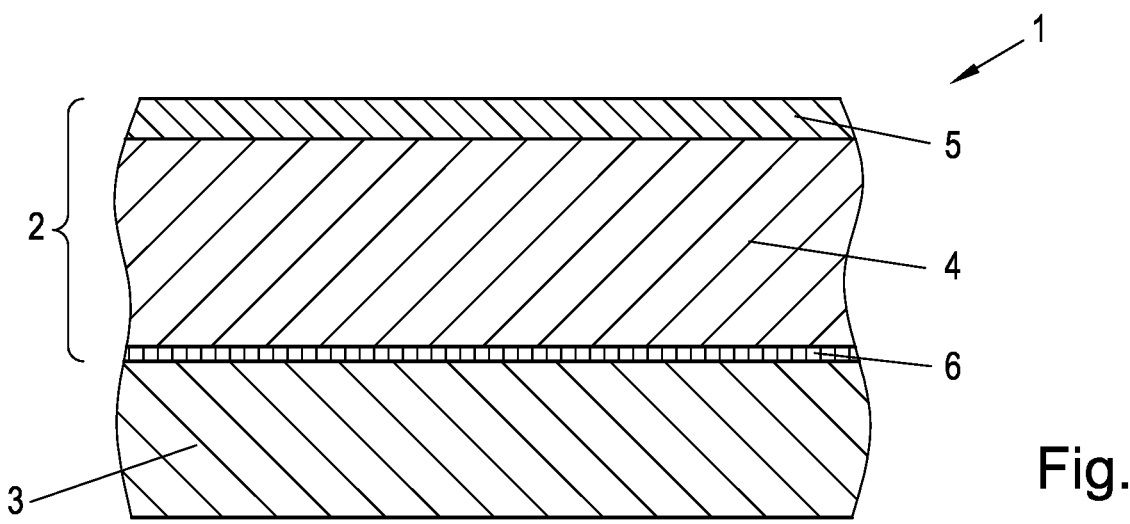
FIG. 1 shows an advantageous embodiment of a packaging laminate of this present teaching with a polyethylene film of this present teaching.

FIG. 1 shows a packaging laminate 1 according to the present teaching with a polyethylene film 2 according to the present teaching and an attached sealing layer 3 made of a sealable polyethylene. The sealing layer 3 can, for example, be laminated onto the polyethylene film 2 by extrusion or using an adhesive. In the case of lamination by extrusion, a suitable bonding agent can be provided between the polyethylene film 2 and the sealing layer 3. In the case of lamination by adhesive, a suitable lamination adhesive is used.

The polyethylene film 2 of this present teaching consists of a first laminate layer 4 and an attached second laminate layer 5. The first laminate layer 4 consists primarily of polyethylene (PE) and materials that are compatible regarding the recyclability. According to the present teaching, the first laminate layer 4 has a content of polyethylene (PE) of high density (HDPE) of at least 60 vol % (volume percent), preferably at least 80 vol %. The PE content in the first laminate layer 4 can approach 100 vol %, but because of the usual additives in packaging laminates 1 (such as slip additives, anti-blocking additives, dyes, fillers, nucleating agents, etc.), a 100 vol % PE content is usually never reached. The rest (aside from possible additives) is a compatible polyolefin material, which does not adversely affect the recyclability of the packaging laminate 1. Compatible polyolefin materials are in principle any kinds of polyethylene, in particular common LDPE, LLDPE, mLLDPE, MDPE, as well as ethylene copolymers, such as for example ethylene vinyl acetate copolymer (EVA), methacrylic acid ethyl ester (EMA), ethyl/acrylic acid copolymer (EAA) or ethylene-butyl acrylate copolymer (EBA). It is also possible to use polypropylene (PP) or a cycloolefin copolymer (COC) at an amount of at most 20 vol % as a compatible polyolefin material. In case of PP, a polypropylene random copolymer with ethylene as a comonomer (usually 5 to 15%), a polypropylene homopolymer, which is sufficiently compatible with linear PE materials, such as mLLDPE, LLDPE or HDPE, is preferably used to achieve at least limited recyclability.

A certain kind of PE can be used in the first laminate layer 4, but a mixture of different kinds of PE or of different kinds of PE in the form of copolymers can also be used. The first laminate layer 4 can be multilayered (extruded or coextruded), with the same or different PE materials, or with polyolefin materials compatible therewith, in the different layers. The thickness of the first laminate layer 4 is preferably 5 to 35 μm.

Figure 2:
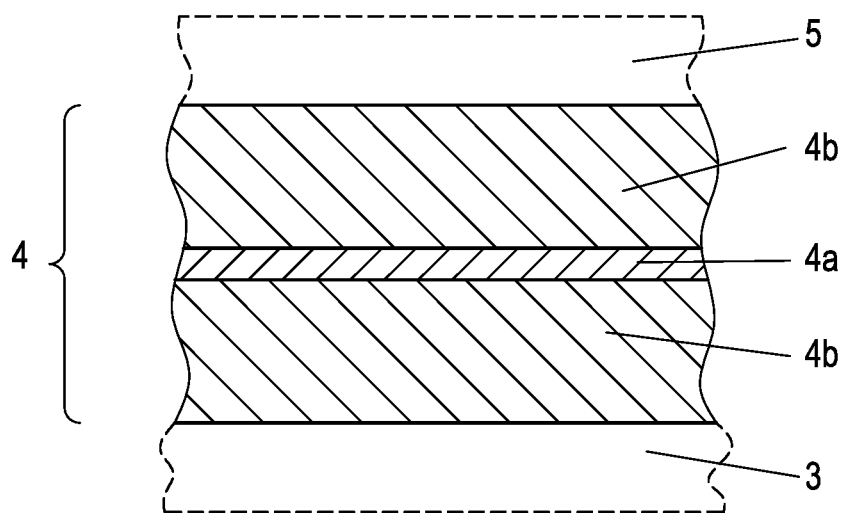
FIG. 2 shows a multilayer polyethylene film of this present teaching.

A first laminate layer 4 could, for example, be produced with a center PE layer 4a and two adjacent HDPE outer layers 4b as shown in FIG. 2. An outer layer 4b is preferably an HDPE layer with a low mLLDPE or LLDPE content (for example 5 to 10 vol %) or an HDPE layer with additional layers of mLLDPE or LLDPE. In such a symmetrical configuration of the first laminate layer 4, the two outer layers 4b of the first laminate layer 4 can be designed to be thicker than the central PE layer 4a, for example in the form of an x/1/x structure with x>1, in particular x=1.5, 2, 3 or 4.

An HDPE is understood to be a PE with a density between 0.94-0.97 g/cm$^3$. Other possible PEs are, for example, a linear polyethylene having a low density (LLDPE) (with a density between 0.87-0.94 g/cm$^3$, a polyethylene having a low density (LDPE) (with a density between 0.915-0.935 g/cm$^3$) or a linear low density metallocene polyethylene (mLLDPE).

Additives are added in small amounts (at most 5 vol %) and they therefore do not adversely affect the recyclability of the packaging laminate 1.

The second laminate layer 5 is a hetero-phase polypropylene block copolymer with a polyethylene content of 5-30 wt. % (weight percent). As is well-known, PP block copolymers are produced by a multiple-step polymerization process, where a copolymer with low α-olefins, in this case PE, is polymerized beside the PP homopolymer in an additional reaction step. The thickness of the second laminate layer 5 is less than 5 μm. The polypropylene block copolymer used has preferably a haze value of less than 20, preferably less than 10, and should have a melting point higher than 155° C., preferably higher than 160° C. Such hetero-phase polypropylene block copolymers with these characteristics are commercially available as raw materials, for example for an extrusion process.

Additives (such as slip additives, anti-block additives, dyes, fillers, nucleating agents, etc.) can also be present in the second laminate layer 5.

It is particularly advantageous for the polyethylene film 2 of this present teaching to contain nucleating agents, by means of which the solidification process is affected, in the second laminate layer 5 and/or in the first laminate layer 4, so as to improve certain properties of the plastic, e.g., the transparence (haze) or the heat resistance. The heat resistance essentially indicates the temperature at which a plastic film starts to melt. With suitable nucleating agents, the heat resistance of the first laminate layer 4 and/or the second laminate layer 5 made of polypropylene block copolymer can be increased by 5-10° C. and the haze value can be lowered by a few points. Typical nucleating agents are commercially available and are, e.g., talc compounds, sorbitol compounds, carboxylic acid salts, such as for example a salt of cyclohexane (di)carboxylic acid or $C_{8-20}$ aliphatic carboxylates. Nucleating agents are added in amounts of 0.01 to 1 wt. %.

The polyethylene film 2 with the first laminate layer 4 and the second laminate layer 5 attached to it is produced by a co-extrusion process, for example a blown film extrusion process or a flat film extrusion process.

After the co-extrusion, the polyethylene film 2 can be imprinted on one of the two outer surfaces, i.e., on the outer surface of the first laminate layer 4 or the outer surface of the second laminate layer 5. A low haze value of the polyethylene film 2 is of advantage if it is imprinted on the side of the first laminate layer 4 opposite the second laminate layer 5 (so-called reverse printing). The printing can be performed by means of a conventional printing process, for example by gravure printing, relief printing or offset printing.

It was surprisingly found that it is not only possible to increase the heat resistance by way of the second laminate layer 5 of the polypropylene block copolymer as the outer layer of the polyethylene film 2, but also the web stiffness, so that the subsequent processing of the polyethylene film 2, in particular imprinting, is facilitated. A smaller register error (a displacement of the printed image of successive color applications) can thus also be achieved as compared to printing on less stiff materials. The higher the web stiffness, in particular in the machine direction of the polyethylene film 2 as the processing direction, the less the polyethylene film 2 elongates when it is imprinted in the printing machine, whereby the register accuracy is improved. This is substantiated by the following example embodiment.

A pure HDPE film with a thickness of 23 μm was produced as the polyethylene film PE1. ELITE™ 5960 G made by The Dow Chemical Company was used as HDPE and the E-modulus was measured at room temperature (23° C.) in the machine direction MD (usually the direction of extrusion) and in the crosswise direction TD transverse to the machine direction. A polyethylene film PE2 according to this present teaching was furthermore produced with a first, 20 μm thick laminate layer 4 of HDPE (again ELITE™ 5960G) and a 3 μm thick second laminate layer 5 of a hetero-phase polypropylene block copolymer, and the E-modulus was again measured at room temperature (23° C.) in the machine direction MD and in the crosswise direction TD. The polypropylene block copolymer that was employed was Moplen EP310J HP from the manufacturer LyondellBasell with a haze value of 6 and a melting temperature of 166° C. The thickness of the polyethylene film PE2 was again 23 μm. The results are listed in Table 1.

TABLE 1

|  | PE1 | | PE2 | |
| --- | --- | --- | --- | --- |
|  | MD | TD | MD | TD |
| E-modulus [MPa] | 497 | 623 | 599 | 676 |
| Web stiffness [N/mm] | 11.4 | 14.3 | 13.7 | 15.5 |
| Haze | 15.9 | | 11.8 | |

After the polyethylene films PE1, PE2 were produced by co-extrusion using the blow film extrusion process, for example, there are always slightly different values of the E-modulus in the machine direction MD (longitudinal direction of the film) and in the crosswise direction (TD), transverse to the longitudinal direction, as a result of the blowup process and the blowup ratio. The E-modulus in the machine direction is more important, because this is the direction in which the film is usually processed, for example the direction in which the film would run through a printing machine. The polyethylene films PE1, PE2 were not stretched.

It is evident that such a thin layer of a hetero-phase PP block copolymer on the outside of the polyethylene film 2 can, as expected, not only significantly increase the heat resistance of the packaging laminate for purposes of sealing (to values above 155° C.), but also the E-modulus and the web stiffness of the polyethylene film PE2 compared to the web stiffness of the polyethylene film PE1. The haze value of the polyethylene film PE2 can be improved as well compared with the polyethylene film PE1 by selecting a PP block copolymer with a low haze value.

This result is surprising insofar as the E-modulus of HDPE and of a PP block copolymer as raw materials for the co-extrusion is approximately the same according to the data sheets. One would thus also expect the E-modulus of the co-extruded polyethylene film 2 to be about the same as that of a pure HDPE film. The E-modulus (and likewise the web stiffness) of the co-extruded polyethylene film 2 in the comparison example is however higher by about 20% than that of the pure HDPE film, which was not expected.

Without seeking scientific proof, this effect is attributed to the fact that in the case of partly crystalline thermoplastics, such as PE or PP, the degree of crystallization and the stiffness drops the faster the material is cooled. The outer layer of an extruded film, e.g., a co-extruded film produced by means of the blown film extrusion process or the flat film extrusion process, cools more rapidly than the core after being extruded, so that the stiffness of the outer layer drops more than that of the core. But, on the whole, polypropylene has a lower degree of crystallization than HDPE. The stiffness-reducing effect caused by the cooling of the co-extruded polyethylene film is thus, on the whole, lower in the hetero-phase polypropylene block copolymer of the external layer than in the HDPE core of the polyethylene film. In sum, this results in the surprising increase of the E-modulus of the co-extruded polyethylene film 2 as compared with the E-modulus of the materials of the individual layers, in particular in comparison with the pure HDPE film. Because of the higher E-modulus, the web stiffness is also greater, in particular in comparison with the pure HDPE film. This surprising effect comes about despite the very low thickness of the second laminate layer 5 of the PP block copolymer.

To produce a packaging laminate of this present teaching 1, the polyethylene film 2 is attached, for example by lamination or extrusion, to a sealing layer 3 at the first laminate layer 4. The polyethylene film 2 can be imprinted as described, but does not necessarily have to be imprinted. If it is imprinted, the imprinted layer 6 can be located between the polyethylene film 2 and the sealing layer 3 (reverse printing), as shown in FIG. 1. Because of the advantageous low haze value, the polyethylene film 2 is sufficiently transparent, so that the printed image on the imprinted layer 6 is sufficiently visible from the outside.

The sealing layer 3, as the third laminate layer of the packaging laminate 1, predominantly consists of a sealable PE material, with the PE content in the entire amount of polymer of the sealing layer 3 amounting to at least 80 vol %, without counting any added mineral or other fillers or additives. In this context, the word sealable means that the sealing layer melts noticeably (at least 40° C., preferably 50° C., particularly preferably 60° C.) below the melting temperature of the second laminate layer 5 made of polypropylene block copolymer. Different kinds of PE, e.g., LDPE, LLDPE, MDPE, HDPE, can be used by themselves or also as mixtures or in the form of copolymers or also in multiple layers (extruded or laminated). The thickness of the sealing layer 3 naturally depends upon the application of the packaging laminate 1 and is typically between 20 to 100 μm. For purposes of the desired recyclability of the packaging laminate 1, the remaining rest of the sealing layer 3 will consist of a compatible polyolefin material as described above, aside from at least 80 vol % of PE materials (beside small amounts of possible additives). The sealing layer 3 can be multilayered, for example extruded, co-extruded or laminated.

Through the use of predominantly PE and materials that are compatible with it in the polyethylene film 2 and in the packaging laminate 1 a particularly recyclable material can be produced, which can be simply and economically recycled by mechanical recycling using usual methods.

The heat resistance can also be increased significantly by way of the outer layer of the packaging laminate 1 made of polypropylene block copolymer, as a result of which the sealing jaw temperature can be increased significantly when the packaging laminate 1 is sealed. Experiments showed that, due to the higher heat resistance, the sealing jaw temperature can be increased to 150° C. to 160° C. depending upon the nature of the polypropylene the block copolymer, without the second laminate layer 5, acting as the outer layer of the packaging laminate 1, sticking to a sealing jaw or producing unwanted markings on the packaging laminate 1.

The packaging laminate 1 and/or the polyethylene film 2 can also contain additional laminate layers if they do not impair the recyclability. A compound layer can, for example, be placed between the second laminate layer 5 and the first laminate layer 4 of the polyethylene film 2 in order to increase the adhesion, in particular to reliably prevent an undesired delamination of the polyethylene film 2, also in the packaging laminate 1. Such a compound layer can additionally increase the toughness of the polyethylene film 2 and of the packaging laminate 1. Suitable compound layers preferably consist of polymers with increased polarity, for example based on polymers that are compatible with polyethylene regarding their recycling properties, such as for example polyolefins (like PE or PP) modified with maleic acid anhydride, ethyl-vinyl acetate copolymers (EVA), ethylene/acrylic acid copolymers (EAA), ethylene-butyl acrylate copolymers (EBA), or similar polyolefin copolymers. The thickness of such a compound layer is typically 1 to 5 μm.

Figure 3:
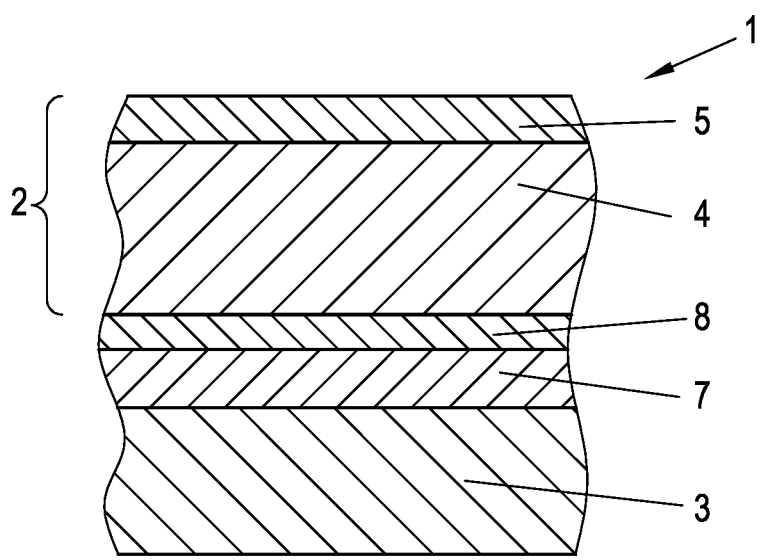
FIG. 3 shows an implementation of the packaging laminate with a barrier layer.

There can also be a barrier layer 7 between the sealing layer 3 and the polyethylene film 2 in the packaging laminate 1 as shown in FIG. 3. The barrier layer 7 preferably consists of a barrier polymer, i.e., a polymer with sufficient barrier properties, particularly against oxygen, hydrogen and/or odors. The barrier polymer is preferably a polyamide (PA) or an ethylene-vinyl alcohol copolymer (EVOH). EVOH is preferred as a barrier polymer. When a barrier layer 7 is used, it is important for the barrier layer 7 to constitute at most 5 vol % of the packaging laminate 1, so that the barrier polymer content in the packaging laminate 1 does not become too high, which would impair the recyclability.

It is furthermore possible to metalize the barrier layer 7 on the side facing the sealing layer 3 (preferably with aluminum) so as to increase the barrier effect and/or to coat it (for example with alumina or silicon oxide) so as to increase the barrier effect and/or the adhesion.

For purposes of increasing the adhesion, a suitable compound layer 8, for example as described above, can additionally be present between the barrier layer 7 and the first laminate layer 4 (also if imprinted) of the polyethylene film 2 (as in FIG. 3) and/or between the barrier layer 7 and the sealing layer 3. The barrier layer 7 can, e.g., be laminated onto the sealing layer 3 and then attached to the polyethylene film 2.

The polyethylene film 2 can for example be attached to the sealing layer 3 (also with barrier layer 7) by lamination, extrusion lamination or extrusion coating with a suitable laminating agent. In performing the lamination, the sealing layer 3 is attached to the polyethylene film 2 by means of a suitable lamination adhesive, for example based on polyurethane adhesives or polyolefin copolymers in the event of extrusion lamination. The thickness of the lamination adhesive is preferably 2 to 5 g/m² while using the usual adhesives based on polyurethane or 5 to 20 g/m² in the event of extrusion lamination. In the event of extrusion coating, the sealing layer 3 is extruded directly onto the polyethylene film 2.

If a barrier layer 7 is present in the sealing layer 3, it is of advantage for the sealing layer 3 to be coated on the polyethylene film 2 very soon after it is produced, so as to thereby reduce the water absorption of the barrier layer 7.

The polyethylene film 2 is preferably produced by means of the blown film extrusion process, because this results in lesser edge off-cuts as a consequence of production. It is also possible to use more viscous HDPE materials with an MFI (Mass Flow Index) of less than 3 with blown film extrusion. Such HDPE material have a higher molecular weight and better mechanical properties, which of advantage for the use of the polyethylene film 2, e.g., in a packaging laminate 1.

Figure 4:
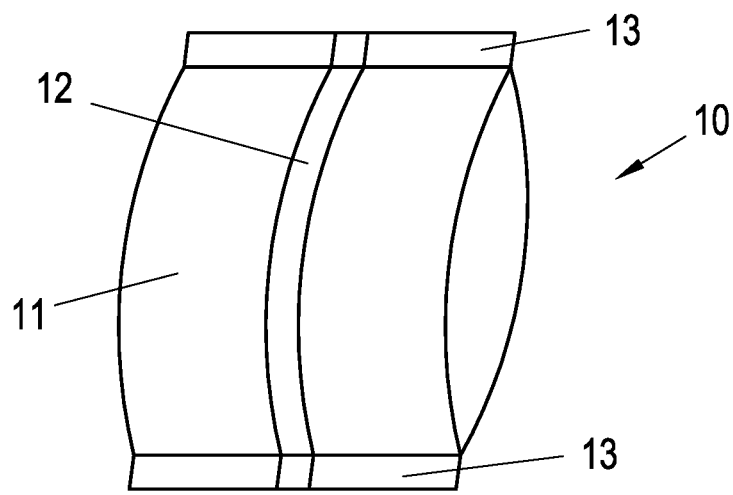
FIG. 4 shows a bag made by sealing a packaging laminate of this present teaching.
Figure 5:
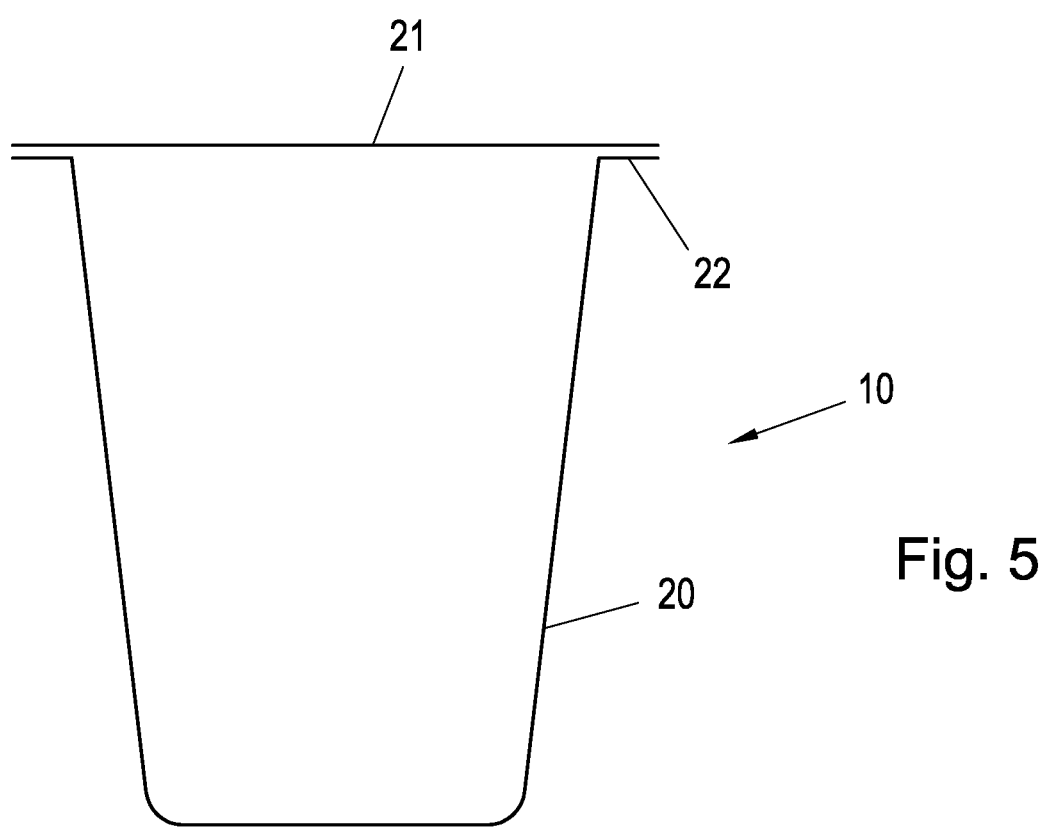
FIG. 5 shows the closing a container by sealing a covering lid made of a packaging laminate of this present teaching.

The packaging laminate 1 of this present teaching is usually used for producing a package 10, e.g., for foods. To accomplish this, the packaging laminate 1 can be cut and formed into the package 10, for example by folding and sealing, as shown in FIG. 4 on the example of a bag 11 with a longitudinal seal 12 and two transverse seals 13. The packaging laminate 1 can however also be processed directly in known continuous packaging machines, e.g., so-called form-fill machines or tubular bag machines. To perform the sealing, the sealing area of the folded packaging laminate 1 is, as is well-known, pressed together between two sealing jaws maintained at a controlled temperature. In doing so, the second laminate layer 5 of the packaging laminate 1 having a high heat resistance faces the sealing jaws. It is also possible for the packaging laminate 1 to be used to produce cover lids 21 to be punched out for purposes of covering containers 20 as a form of packaging as shown in FIG. 5. In all instances, the sealing layer 3 of the packaging laminate 1 is sealed, either to its own sealing layer (e.g., in the case of folded packaging, such as bags, sacs, pouches) or to another sealing layer (e.g., at the sealing edge 22 of a container 20). The sealing layer 3 faces the packaged product in the finished packaging 10 with the second laminate layer 5 on the outside.

The invention claimed is:

1. A recyclable polyethylene film with:
a first laminate layer of at least 60 vol % HDPE, and
a second laminate layer made of polypropylene, which is attached to the first laminate layer by co-extrusion to form the polyethylene film, with the thickness of the polyethylene film being less than 40 µm,
wherein the polypropylene of the second laminate layer is a hetero-phase polypropylene block copolymer with a polyethylene content of 5-30 wt. % and has a melting point higher than 155° C. while the thickness of the second laminate layer is less than 5 µm.

2. The recyclable polyethylene film according to claim 1, wherein the polypropylene block copolymer has a haze value of less than 20.

3. The recyclable polyethylene film according to claim 1, wherein the polyethylene film is imprinted on the outer surface of the polyethylene film.

4. The recyclable polyethylene film according claim 1, wherein the first laminate layer and/or the second laminate layer contains 0.1 to 1 wt. % of a nucleating agent.

5. A recyclable packaging laminate with a recyclable polyethylene film according to claim 1, with the polyethylene film being attached a sealing layer made of a sealable polyethylene at the first laminate layer.

6. The recyclable packaging laminate according to claim 5, wherein a barrier layer is placed between the polyethylene film and the sealing layer.

7. The recyclable packaging laminate according to claim 6, wherein the barrier layer consists of polyamide or an ethyl-vinyl alcohol copolymer.

8. The recyclable polyethylene film according to claim 1, wherein the first laminate layer comprises at least 80 vol % HDPE.

9. The recyclable polyethylene film according to claim 1, wherein the polypropylene of the second laminate layer has a melting point higher than 160° C.

10. The recyclable polyethylene film according to claim 2, wherein the polypropylene block copolymer has a haze value of less than 10.

11. The recyclable polyethylene film according to claim 3, wherein the polyethylene film is imprinted on the outer surface facing away from the second laminate layer.

12. The recyclable packaging laminate according to claim 5, wherein the first laminate layer comprises at least 80 vol % HDPE.

13. The recyclable packaging laminate according to claim 5, wherein the polypropylene of the second laminate layer has a melting point higher than 160° C.

14. The recyclable packaging laminate according to claim 5, wherein the polypropylene block copolymer has a haze value of less than 10.

15. The recyclable packaging laminate according to claim 5, wherein the polyethylene film is imprinted on the outer surface of the polyethylene film facing away from the second laminate layer.

* * * * *